United States Patent [19]

Haselier

[11] Patent Number: 4,939,181
[45] Date of Patent: Jul. 3, 1990

[54] POLYETHYLENE COMPOSITION, OBJECTS MADE THEREFROM AND PROCESS FOR THE MANUFACTURE OF FOAMED OBJECTS

[75] Inventor: Franciscus J. J. Haselier, Schinnen, Netherlands

[73] Assignee: Stamicarbon B.V., Geleen, Netherlands

[21] Appl. No.: 436,750

[22] Filed: Nov. 15, 1989

Related U.S. Application Data

[62] Division of Ser. No. 337,874, Apr. 14, 1989.

[30] Foreign Application Priority Data

May 19, 1988 [NL] Netherlands ............... 8801297

[51] Int. Cl.$^5$ ............... C08J 9/10; C08J 9/14
[52] U.S. Cl. ............... 521/81; 264/53; 264/54; 521/79; 521/134; 521/143
[58] Field of Search ............... 521/81, 79, 134, 143; 264/53, 54

[56] References Cited

U.S. PATENT DOCUMENTS 4,223,567 11/1986 Hert ............... 525/240
4,413,097 11/1983 Matsumura et al. ............... 525/240

FOREIGN PATENT DOCUMENTS 0256724 2/1988 European Pat. Off. .
58-093741 6/1983 Japan .
59-149941 8/1984 Japan .
61-258849 11/1986 Japan .
62-010150 1/1987 Japan .
62-064846 3/1987 Japan .
58485 7/1969 Luxembourg .
692856 5/1969 South Africa .
86/00628 1/1986 World Int. Prop. O. .

Primary Examiner—Morton Foelak
Attorney, Agent, or Firm—Cushman, Darby and Cushman

[57] ABSTRACT

The invention relates to polyethylene compositions comprising 20–98 wt. % branched polyethylene (a) with a density of between 915 and 940 kg/m$^3$ and a melt flow index of between 0.05 and 40 dg/minute, prepared by a high pressure radical process, and 2–80 wt. % substantially linear polyethylene (b) with a density of between 850 and 915 kg/m$^3$, a melt flow index of between 0.05 and 25 dg/minute and a DSC crystallinity at 23° C. of at least 10%, prepared with the aid of a transition metal catalyst, the difference between the highest crystallization temperature of branched polyethylene (a) and the highest DSC crystallization temperature of linear polyethylene (b) being at most 10° C. and the mixture having a modulus of elasticity of at most 280 N/mm$^2$ and objects made therefrom. These polyethylene compositions, when processed to foamed objects, have a high resistance to high temperatures as well as a high flexibility.

4 Claims, 16 Drawing Sheets

POLYETHYLENE COMPOSITION, OBJECTS MADE THEREFROM AND PROCESS FOR THE MANUFACTURE OF FOAMED OBJECTS

This is a division of application No. 07/337,874, filed Apr. 14, 1989.

BACKGROUND AND SUMMARY OF THE INVENTION

The invention relates to a polyethylene composition and objects made therefrom. The invention also relates to a process for the manufacture of foamed objects from the polyethylene composition.

Foamed objects from low density polyethylene (LDPE) can be made by techniques which have been known for a long time. (Plastic Foams Part 1, Kurt C. Frisch & James H. Saunders (Eds.), pp 281-292). Such a polyethylene has a density of between 915 and 940 kg/m$^3$ and is made in a high pressure process with the aid of one or more radical initiators. Foamed products from this LDPE have excellent properties that can be adjusted at will to suit any of a broad range of applications, for example by making the cells open or closed as desired, or large or small, in a wide variety of foam densities and foam shapes.

Thanks to these properties, objects from foamed LDPE are broadly applicable, e.g. as insulation material. Open-cell foams, for example, are used for acoustic insulation and closed-cell foams for thermal insulation. Further, LDPE foams are suitable for application as packaging for fragile or delicate objects, on account of their good energy-absorbing properties and their generally high resistance to chemicals.

The several applications impose different requirements on the foam, e.g. softness, flexibility, cold brittleness, environmental stress crack resistance (ESCR) and the like. It is known that these properties are increasingly present if the foams are made of LDPE with lower densities and/or with increasing amounts of incorporated polar comonomers, e.g. vinyl acetate, acrylate, methacrylate, methyl methacrylate and the like. When such polar copolymers are used, the above-mentioned properties of LDPE foams can to a greater extent be adjusted to the requirements than in the case of the homopolymer LDPE.

However, a disadvantage of polar copolymer foams is that, although the flexibility increases with the amount of comonomer incorporated, the high temperature resistance of the foam decreases. The softening and melting range of polar copolymers lies at lower temperatures than the softening and melting range of LDPE homopolymer. This limits the field of application of flexible foams. Further, the polar copolymers are more likely to give rise to sticking problems during their conversion to (foamed) objects.

The object of the invention is to obtain polyethylene compositions which, when processed to foamed objects, have a high resistance to high temperatures as well as a high flexibility.

This object is achieved by a polyethylene composition comprising 20-98 wt% branched polyethylene (a) with a density of between 915 and 940 kg/m$^3$ and a melt flow index of between 0.05 and 40 dg/minute, prepared by a high-pressure radical process, and 2-80 wt% of a substantially linear polyethylene (b) with a density of between 850 and 915 kg/m$^3$, a melt flow index of between 0.05 and 25 dg/minute and a DSC crystallinity at 23° C. of at least 10%, made with the aid of a transition metal catalyst, the difference between the highest DSC crystallization temperature of branched polyethylene (a) and the highest DSC crystallization temperature of linear polyethylene (b) being at most 10° C. and the mixture having a modulus of elasticity of at most 280 N/mm$^2$.

DETAILED DESCRIPTION OF THE INVENTION

Figure 1:
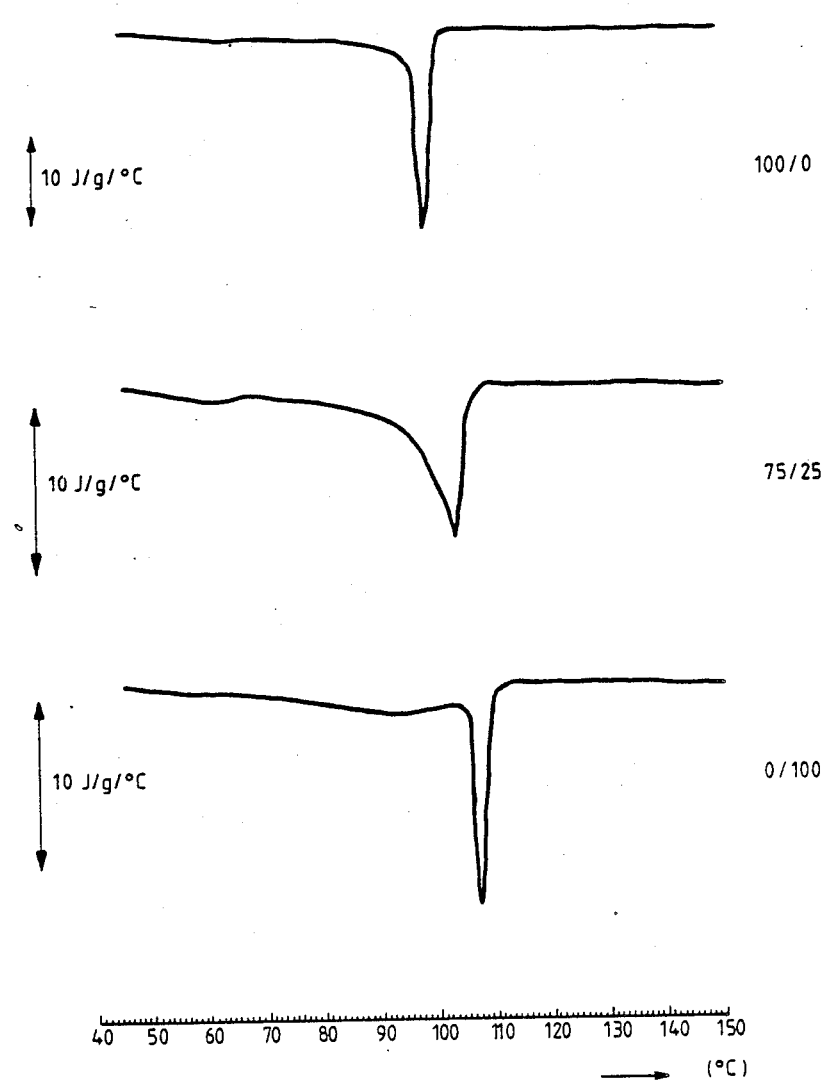
FIG. 1 shows the DSC crystallization curves of the compositions of Example I.

It has been found that LDPE foams with favourable properties can be made when a high melt drawing force as well as a high maximum melt draw ratio are present in the molten material. In this way, it is prevented that the foam collapses during the transition from molten foam to crystallized foam in foaming processes with physical foaming agents, or during expansion in foaming processes with chemical foaming agents. To this end, the melt drawing force should be at least 10 cN and preferably at least 15 cN, while the maximum melt draw ratio should be at least 30 and preferably 40.

The E-modulus (modulus of elasticity), which is a measure of the rigidity of the unfoamed starting material, is in LDPE homopolymer often higher than would be desirable for a good flexibility when the material is processed to a (foamed) object. For a good flexibility, the E-modulus should be at most 280 N/mm$^2$, and preferably at most 250 N/mm$^2$, in particular at most 230 N/mm$^2$. At an LDPE density of 915 kg/m$^3$, the E-modulus is about 160 N/mm$^2$, and it increases with increasing density. However, the high-temperature resistance of a foamed object from such material is too low for many applications (less than 100° C.). A foamed object from an LDPE with a density of 925 kg/m$^3$ is resistant to temperatures of more than 100° C., but this LDPE has an E-modulus of about 350 N/mm$^2$.

Surprisingly, it has been found that polyethylene compositions according to the invention have a melt drawing force of at least 10 cN, in particular at least 15 cN, and a melt draw ratio of at least 30, in particular at least 40, and that, when they are processed to foamed objects, they yield soft and flexible foams that have a good high-temperature resistance (more than 100° C.). From GB-A-1,552,435 and EP-A-0016348, mixtures of branched polyethylene with a density of between 915 and 935 kg/m$^3$ and a linear polyethylene with a density of between 918 and 940 kg/m$^3$ are known. These have the favourable properties of the known LDPE, but they, too, lack flexibility and softness.

The polyethylene (a) of compositions according to the invention is preferably polyethylene homopolymer (LDPE) with a density of between 918 and 928 kg/m$^3$, in particular between 922 and 928 kg/m$^3$; the melt flow index is preferably between 0.1 and 30 dg/minute, in particular below 10 dg/minute. It is produced in the usual manner, in a high pressure process with the aid of one or more radical initiators. This process yields a polyethylene that has long side chains and that is therefore sometimes called a branched polyethylene.

Polyethylene (a) according to the invention may also be a copolymer of ethylene with vinyl acetate, acrylic acid and the like, with a percentage of incorporated polar comonomer of at most 2 mole %, or a mixture of LDPE with a polar copolymer (with a copolymer incorporation percentage that may in this case also be higher than 2 mole %, e.g. 8 mole % or more). In these cases, an LDPE homopolymer weight percentage of 50 is recommendable.

The polyethylene (b) of the compositions according to the invention is a linear polyethylene with a density of, preferably, between 880 and 912 kg/m$^3$, in particular less than 910 kg/m$^3$, and a melt flow index preferably between 0.1 and 20 dg/minute, in particular below 15 dg/minute. It is a copolymer of ethylene and one or more 1-alkenes with 3 to 18 carbon atoms in an amount of 10 to 50 wt %, referred to the ethylene, and possibly a small amount of dienes. Copolymers with 4 to 12 carbon atoms, in particular 1-butene, 1-hexene, 4-methylpentene-1 and 1-octene, are preferred. It has mainly short side chains and considerably fewer long side chains than LDPE, which is why it is also called linear polyethylene. It has a crystallinity of more than 10% at 23° C., as determined by the Differential Scanning Calorimetry method, and preferably more than 15%, in particular more than 20%. It is produced with the aid of transition metal catalysts, preferably the so-called Ziegler-Natta catalysts, in particular those catalysts comprising at least a titanium compound and an aluminum compound, a magnesium compound and/or a vanadium compound and/or a chloride possibly also being present. The process is known as such and can take place at high or low pressures and at high or low temperatures. Particular preference is given to a process in the presence of a dispersing agent, with the pressure not exceeding 200 bar, in particular not exceeding 100 bar, and the temperature being higher than 110° C., in particular higher than 135° C.

The amounts of the polyethylene components (a) and (b) slightly depends on the application. In general, an amount of 30-90 wt % of polyethylene (a) and 10-70 wt % of polyethylene (b) is to be preferred, in particular 40-85 wt % of polyethylene (a) and 15-60 wt % of polyethylene (b), more in particular 50-85 wt % of polyethylene (a) and 15-50 wt % of polyethylene (b).

The mixing can be done in a usual manner, for example by tumbling of granular polyethylene, by using a Henschel mixer for powdered polyethylene or in a Banbury mixer or an extrusion mixer. The polyethylenes (a) and (b) can also very well be fed directly, in the appropriate ratio, to the extrusion device that is generally used to convert polyethylene to objects, without prior mixing. The manner of mixing, within the usual time and temperature ranges, is not critical to the invention.

Polyethylene compositions according to the invention can be converted in many processes known as such, e.g. injection moulding, rotational moulding, blow moulding, profile extrusion, film manufacturing, etc. However, the polyethylene compositions are particularly suitable for conversion to foamed objects. This can be done in different manners, which are generally divided into processes with chemical foaming agents and processes with physical foaming agents.

In chemical foaming, a substance is added to the polyethylene mixture as foaming agent which, under certain conditions (e.g. a temperature rise), which are well-known to a person skilled in the art, decomposes into gaseous components with generation of pressure, thus causing the polyethylene to foam.

In physical foaming, the polyethylene composition is at an increased pressure and temperature mixed, usually in an extrusion device, with one or more foaming agents that are gaseous at normal pressure and room temperature, and is then exposed to a lower pressure and temperature, as a result of which the mixture expands and the polyethylene starts to foam. In this process, the polyethylene also cools down and crystallizes. In physical foaming, usually use is made of (mixtures of) halogenated hydrocarbons, (mixtures of) gaseous alkanes or mixtures of these substances. Commonly used amounts are e.g. 0.01-0.6 gram molecule of foaming agent per 100 parts polyethylene. In this way, foam densities are obtained which can vary between 5 and 400 kg/m$^3$, depending on the conditions applied (type of foaming agent, type of seeding agent, temperature, pressure, additives, etcetera). A person skilled in the art well knows how to vary these conditions according to the requirements.

In foam production, whether or not a good foam quality is obtained depends to an important extent on the crystallization behavior of the polyethylene. The crystallization behaviour of polymers can be determined by the Differential Scanning Calorimetry (DSC) method. The crystallization curves determined with this method show one or more peaks, depending on the molecular structure of the materials tested. The tops of these peaks are called the crystallization temperatures. It has been found that the difference between the highest DSC crystallization temperature of branched polyethylene (a) and the highest crystallization temperature of linear polyethylene (b) may be at most 10° C., since otherwise the mixture formed crystallizes across too broad a crystallization range, resulting in undesirable demixing. A difference of at most 8° C. is to be preferred, in particular a difference of at most 7° C. The DSC crystallization curves of the compositions according to the invention preferably have at most one peak between 125° C. and 95° C., which peak may have a shoulder or may be broad (more than about 10° C. at the base) or narrow (less than about 10° C. at the base).

Peaks without shoulders are to be preferred, in particular narrow peaks.

Polyethylene compositions according to the invention are excellently suitable for manufacturing foamed objects. It is recommendable to use physical foaming agents, such as pentane, chlorofluorohydrocarbons, carbon dioxide, nitrogen, mixtures thereof, etc. The use of chemical foaming agents, such as azodicarbonamide or azodiformamide and the like is also possible.

The high-temperature resistance of polyethylene compositions according to the invention can be considerably increased if a crosslinking agent is used, e.g. organic peroxides, oxygen, multifunctional allyl- and/or vinyl monomers, and azido- and vinyl-functional silanes. Crosslinking can take place to a greater or lesser extent, as desired, which can be achieved by varying the amount of crosslinking agent, e.g. between 0.005 and 5.0 wt % referred to the total composition. In doing so, the good flexibility is retained.

The polyethylene compositions can in addition comprise other substances, such as seeding agents, foam stabilizers, thermal stabilizers, UV-stabilizers, antistatic agents, lubricants, antioxidants, antiblocking agents, fillers, pigments, processing aids, etc.

For the above-described physical foaming technique, the presence of a lubricant, e.g. 0.05–1.5 wt % oleamide, is desirable. In chemical foam processing, often also the presence of a so-called kicker is desired, which ensures synchronization of the decompositions of crosslinking agent and foaming agent. In general, this is a metal oxide, in particular zinc oxide.

Foamed objects according to the invention can be manufactured in any desired shape, such as profiles (e.g. rods and tubes), granules, films, layers on films of other materials, etc. It is also possible to make foamed objects according to the invention by causing foamed granules to stick or melt together by heating. This technique is known as such.

The invention will now be elucidated with reference to a few examples, without, however, being limited thereto.

Various polyethylene mixtures were composed as indicated in the examples.

All copolymers were octene-1 copolymers and had a DSC crystallinity at 23° C. of more than 10%.

Figure 2:
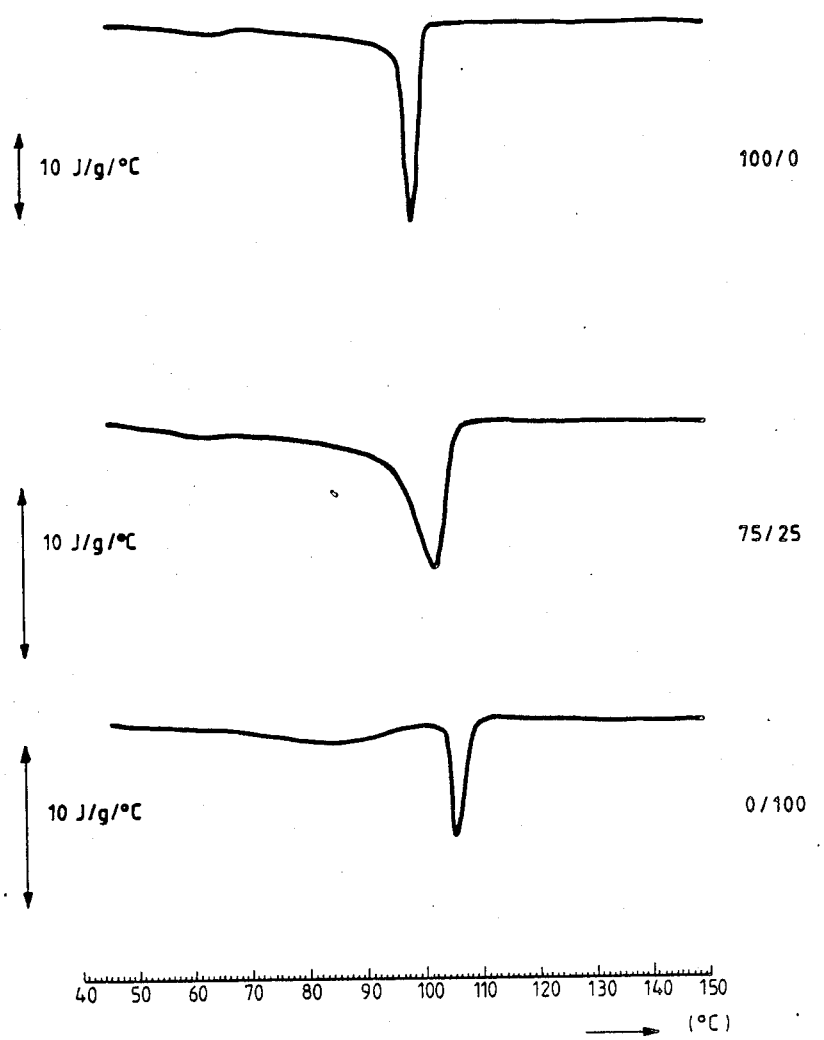
FIG. 2 shows the DSC crystallization curves of the compositions of Example II.
Figure 3:
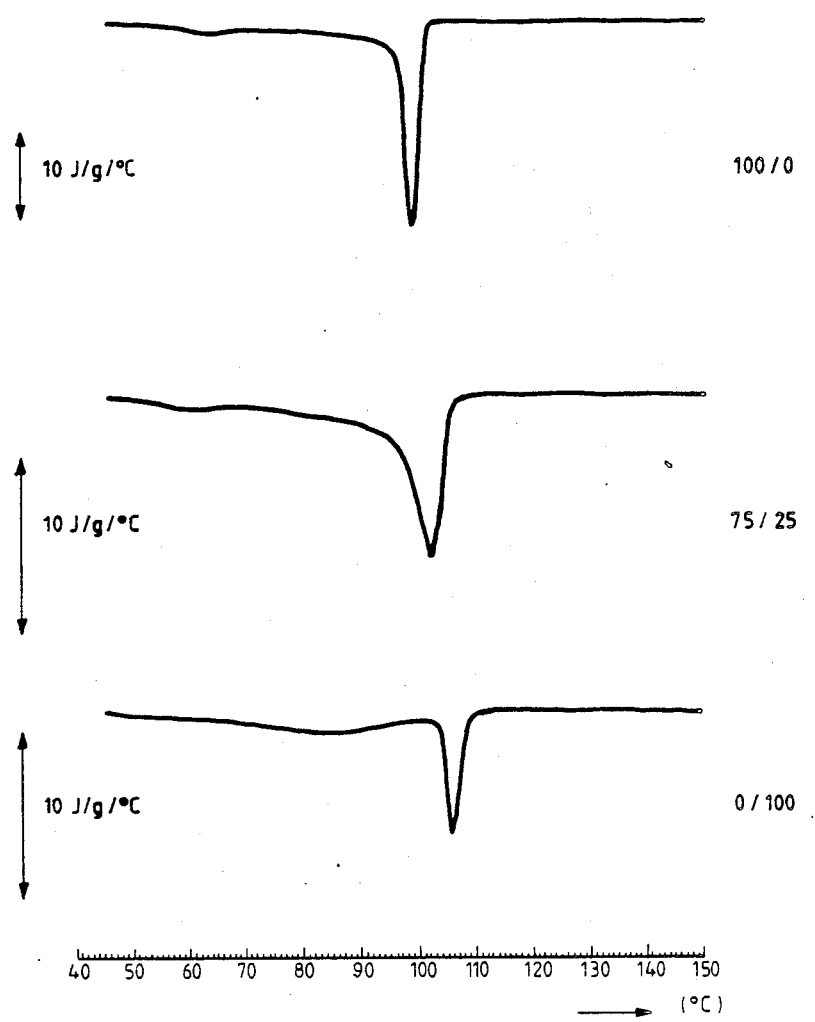
FIG. 3 shows the DSC crystallization curves of the compositions of Example III.
Figure 4:
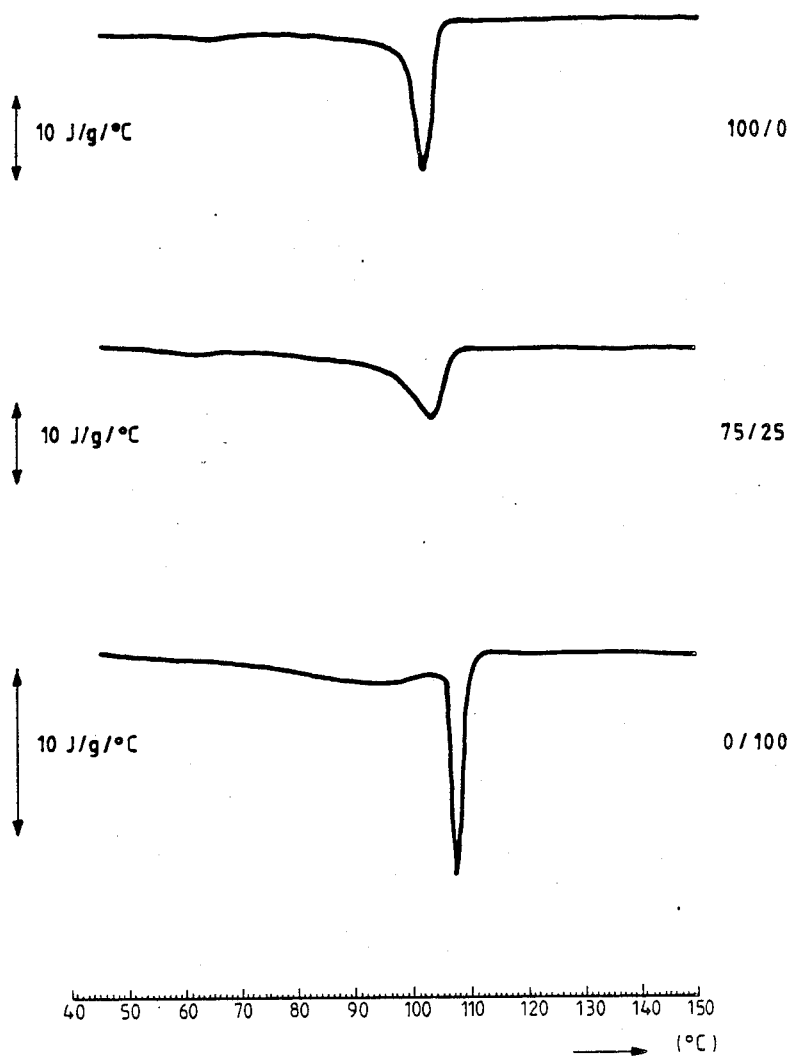
FIG. 4 shows the DSC crystallization curves of the compositions of Example IV.
Figure 5:
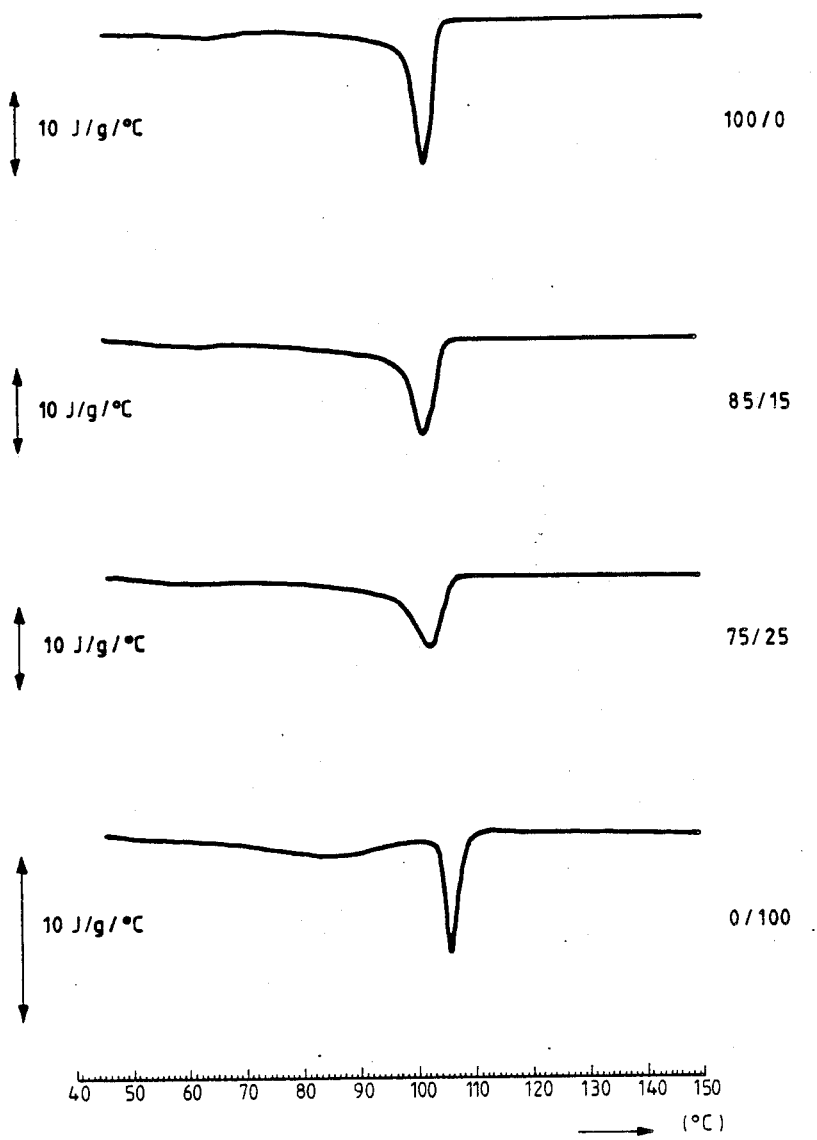
FIG. 5 shows the DSC crystallization curves of the compositions of Example V.
Figure 6:
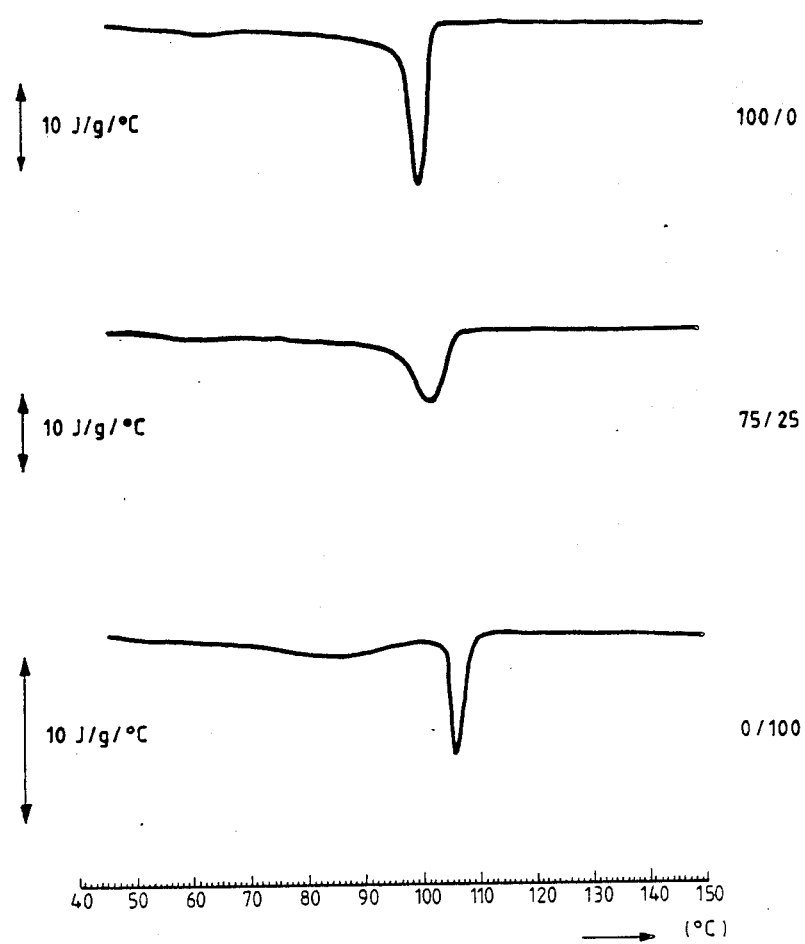
FIG. 6 shows the DSC crystallization curves of the compositions of Example VI.
Figure 7:
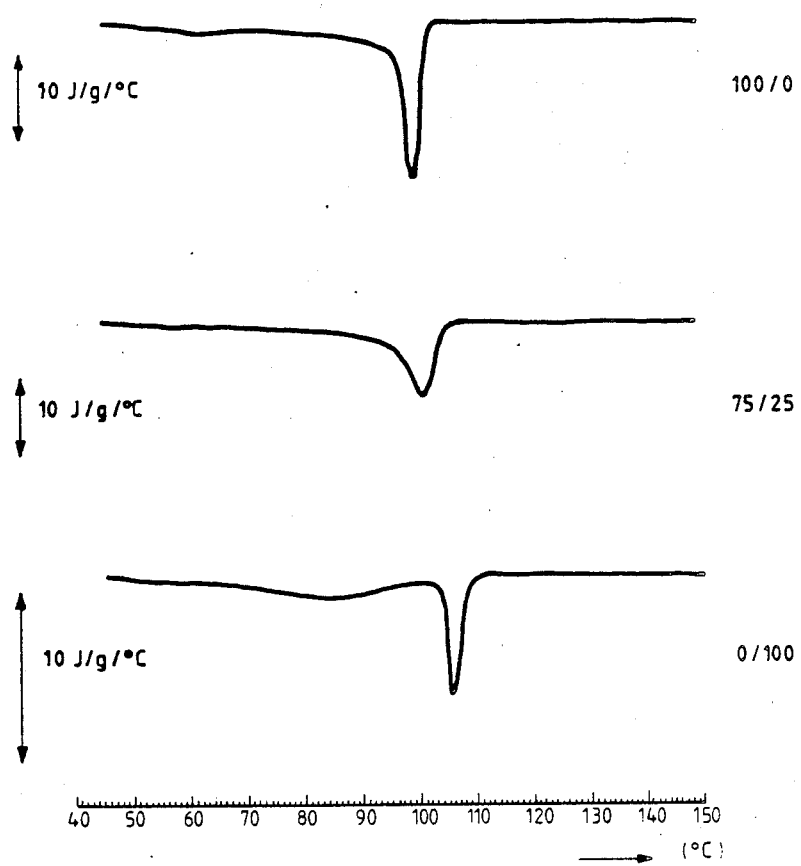
FIG. 7 shows the DSC crystallization curves of the compositions of Example VII.
Figure 8:
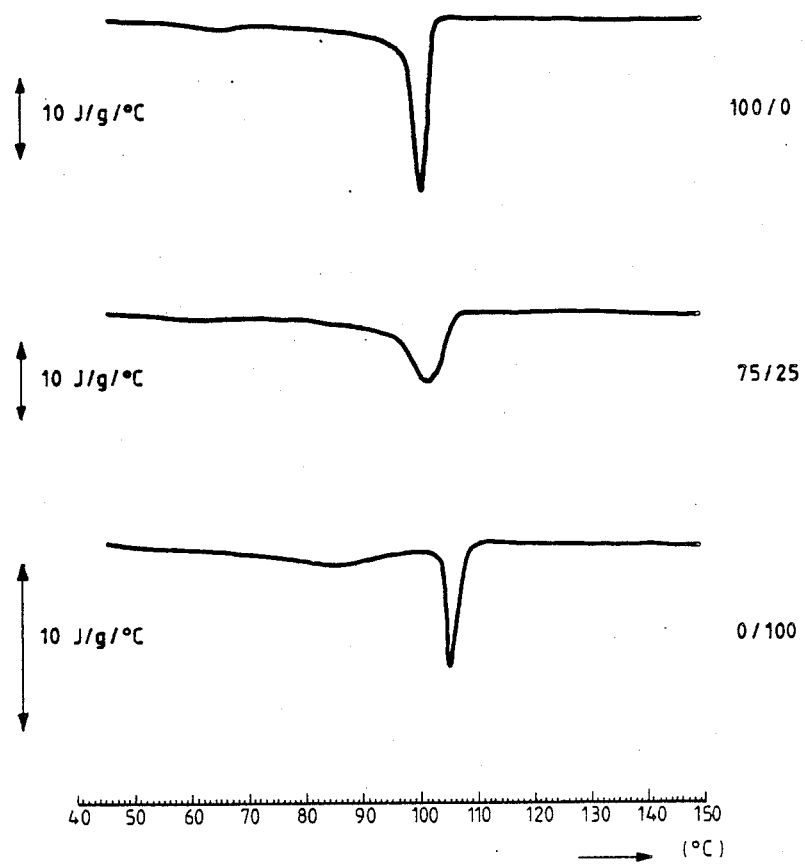
FIG. 8 shows the DSC crystallization curves of the compositions of Example VIII.
Figure 9:
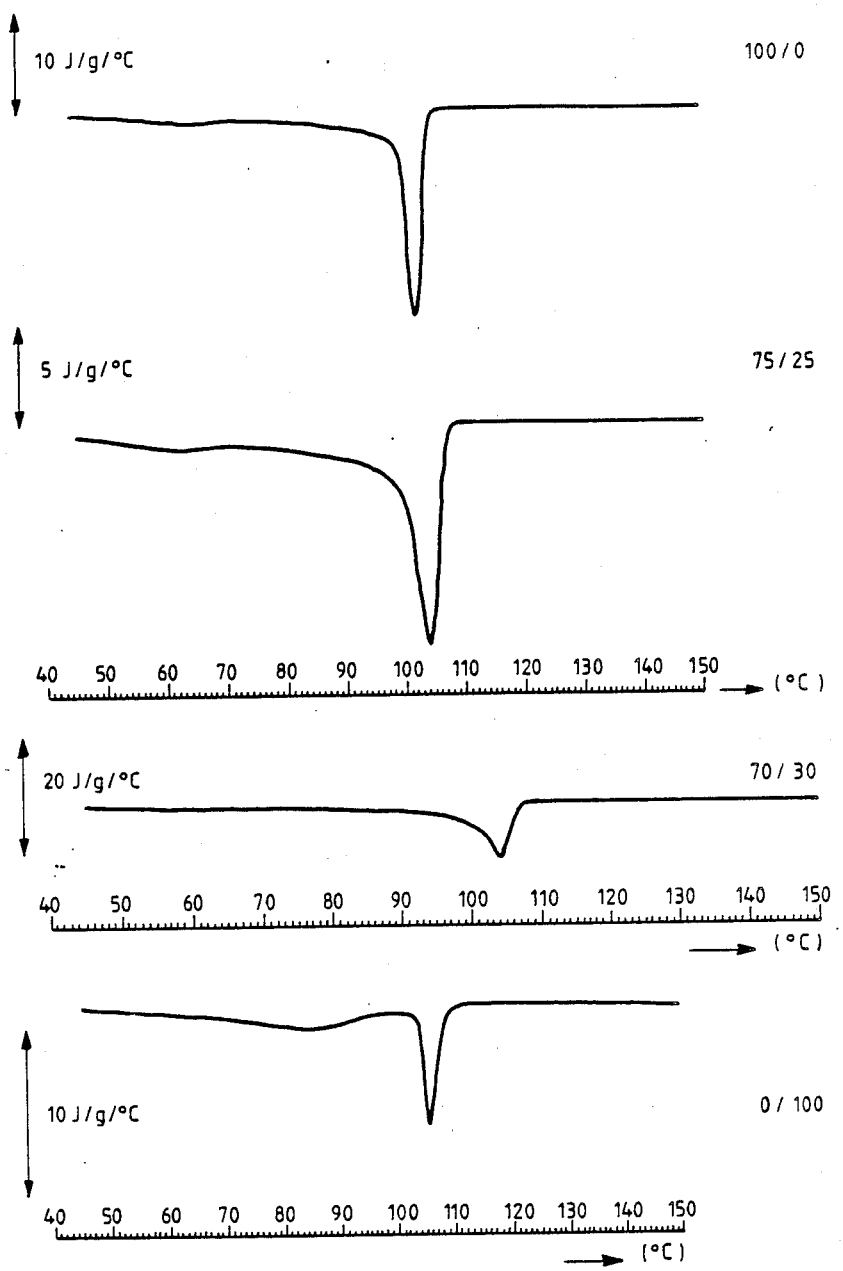
FIG. 9 shows the DSC crystallization curves of the compositions of Example IX.
Figure 10:
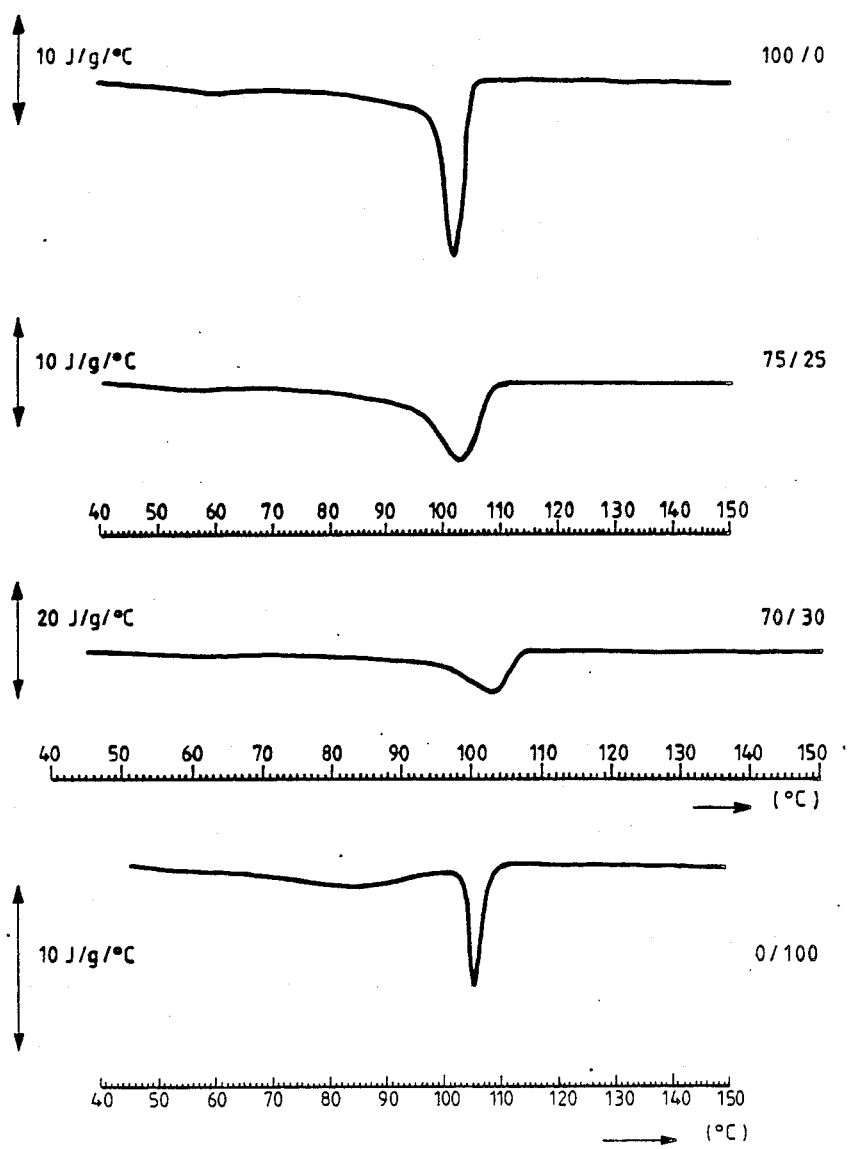
FIG. 10 shows the DSC crystallization curves of the compositions of Example X.
Figure 11:
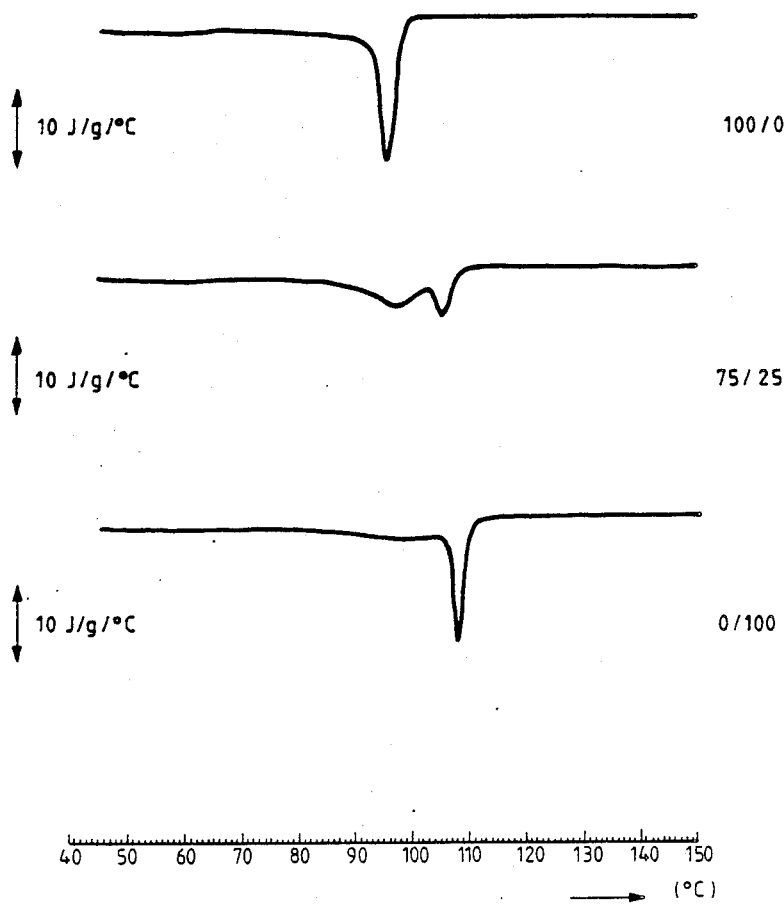
FIG. 11 shows the DSC crystallization curves of the compositions of Comparative example 1.
Figure 12:
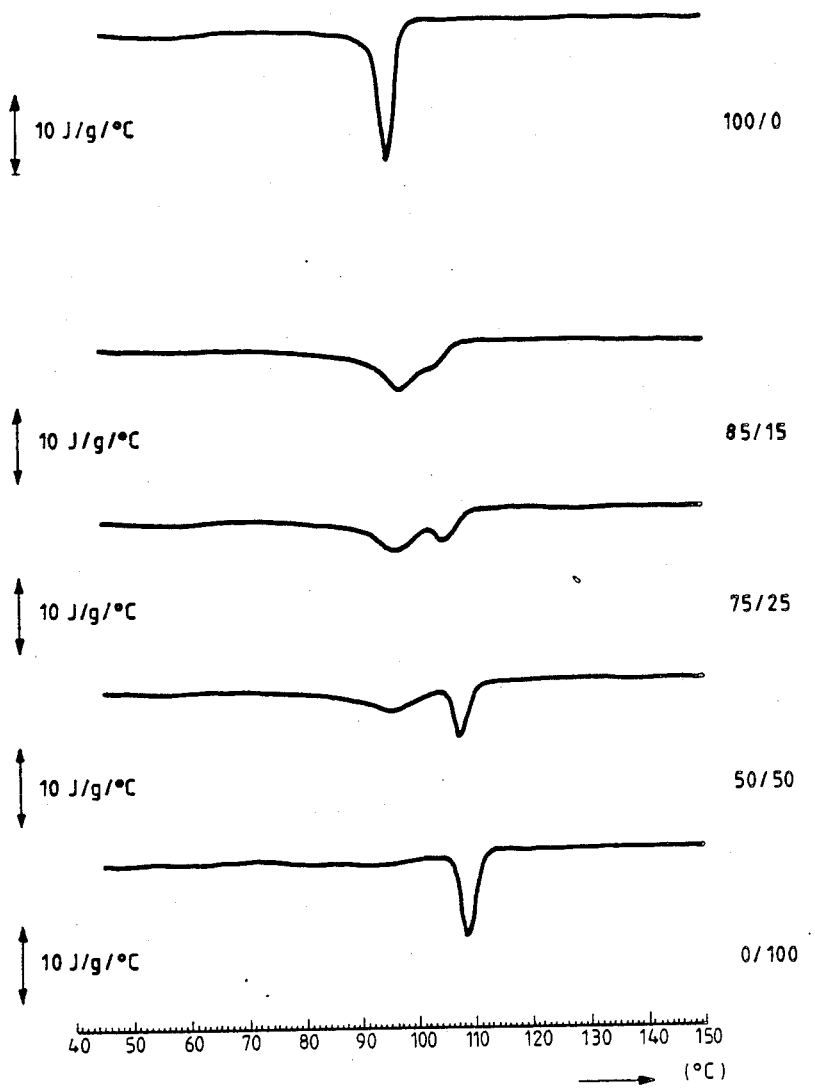
FIG. 12 shows the DSC crystallization curves of the compositions of Comparative example 2.
Figure 13:
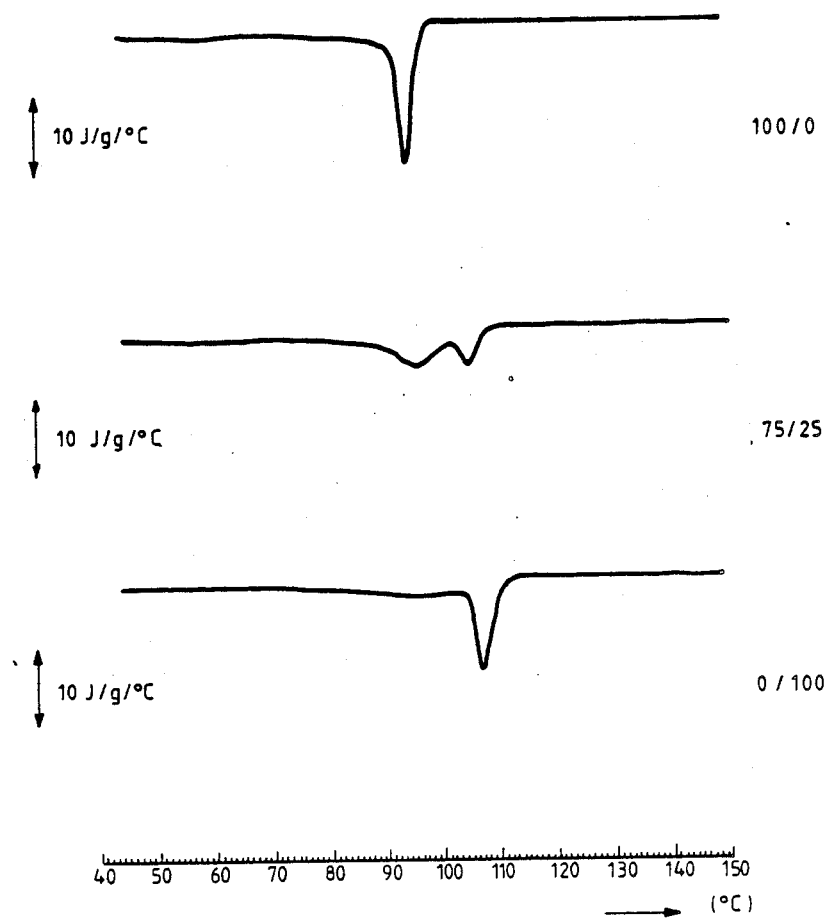
FIG. 13 shows the DSC crystallization curves of the compositions of Comparative example 3.
Figure 14:
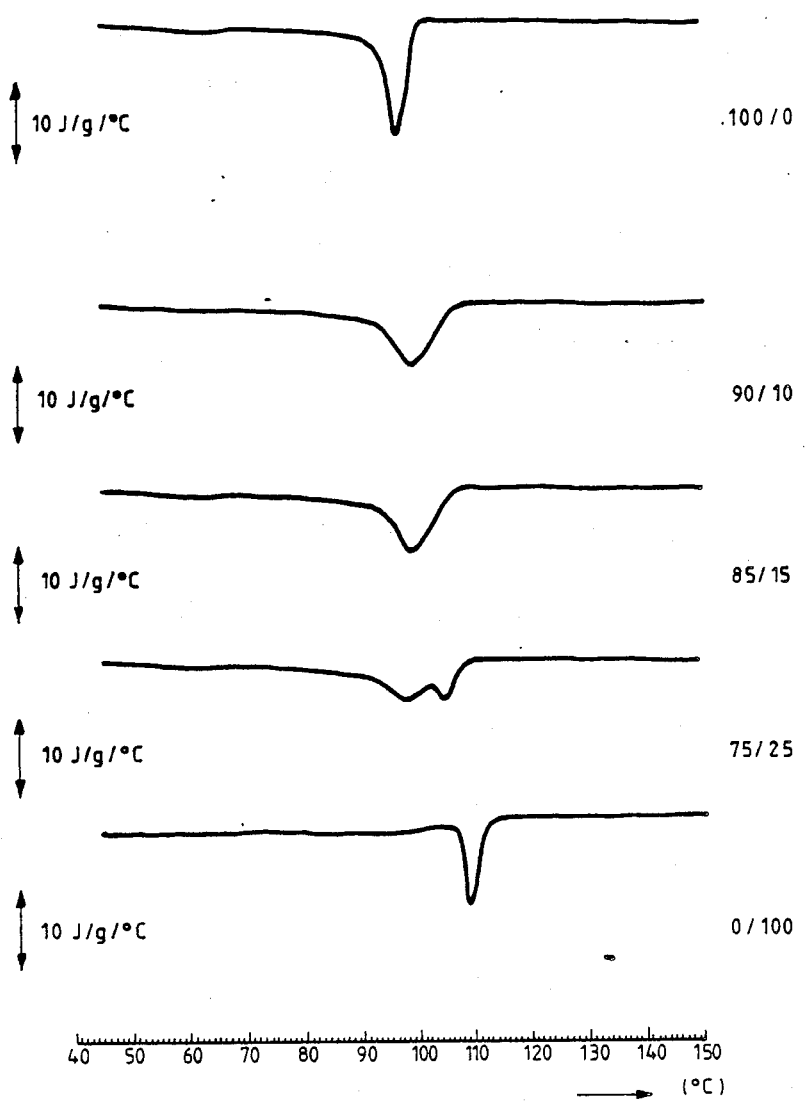
FIG. 14 shows the DSC crystallization curves of the compositions of Comparative example 4.
Figure 15:
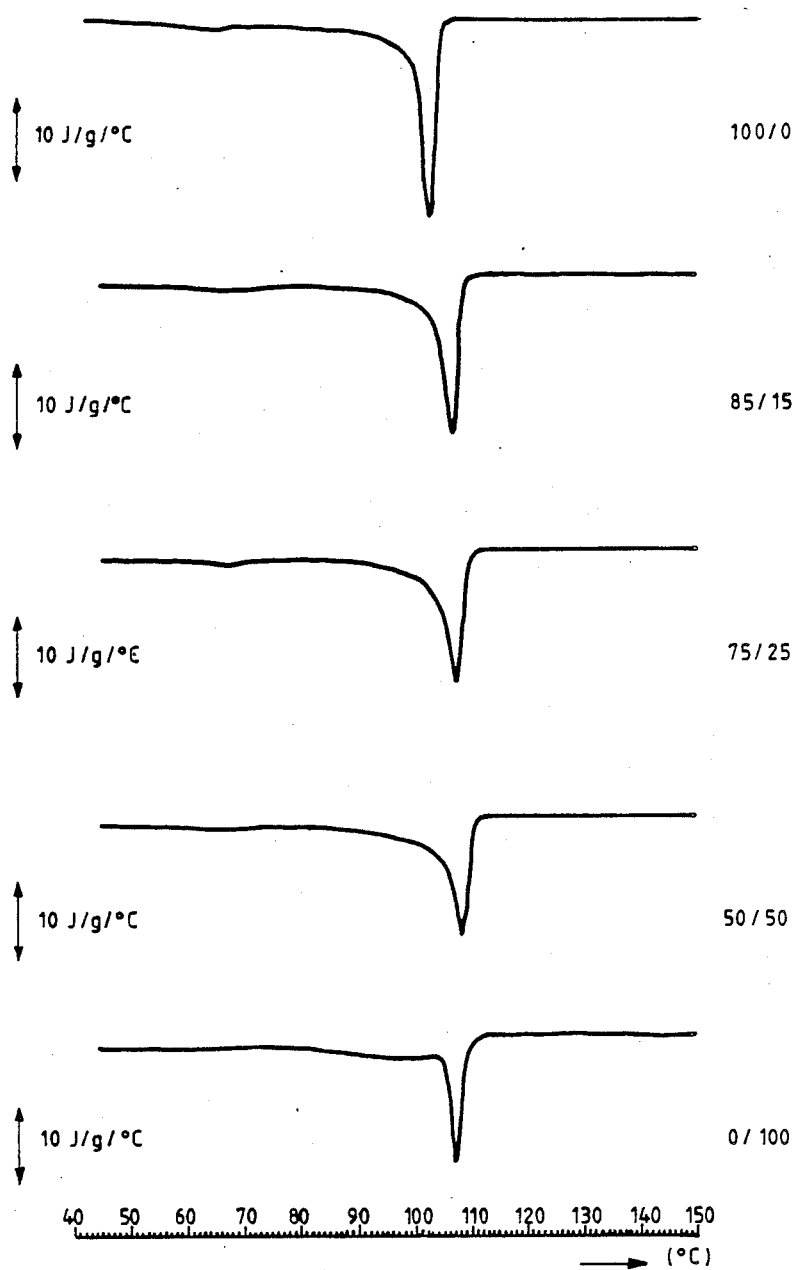
FIG. 15 shows the DSC crystallization curves of the compositions of Comparative example 5.
Figure 16:
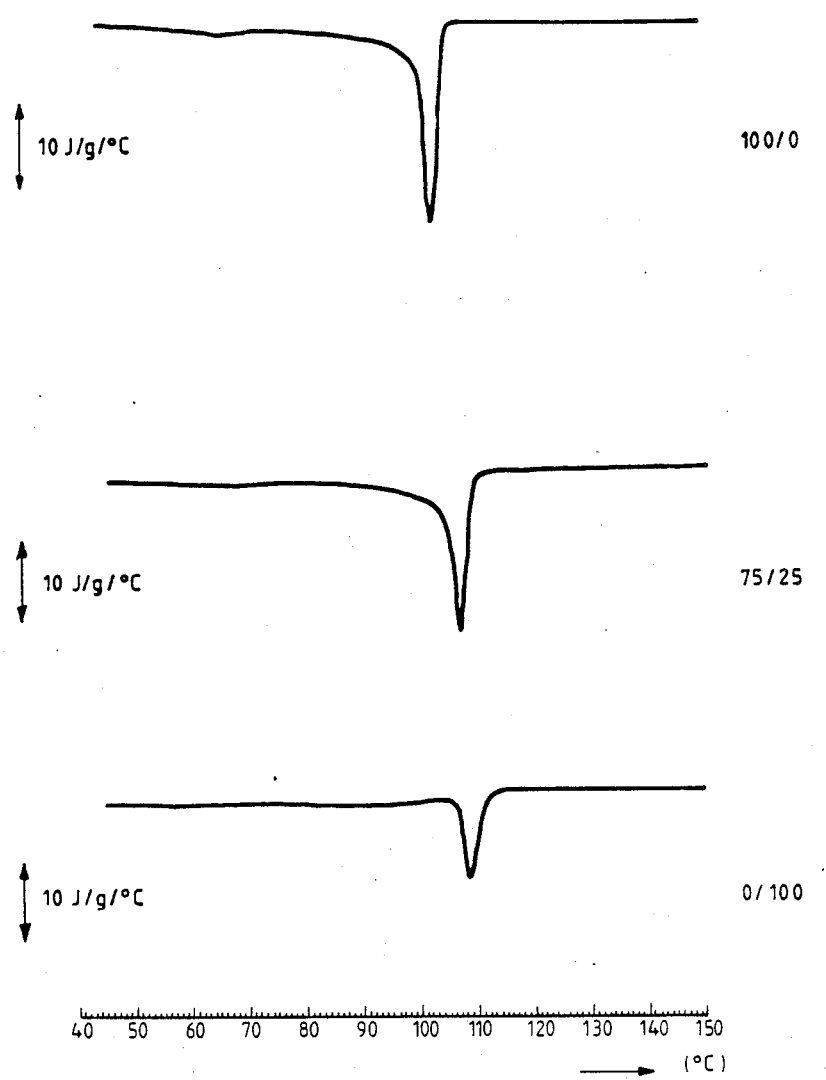
FIG. 16 shows the DSC crystallization curves of the compositions of Comparative example 6.

In FIG. 1, the DSC crystallization curves of the compositions of Example I are shown, in FIG. 2 those of Ex. II, in FIG. 3 those of Ex. III, in FIG. 4 those of Ex. IV, in FIG. 5 those of Ex. V, in FIG. 6 those of Ex. VI, in FIG. 7 those of Ex. VII, in FIG. 8 those of Ex. VIII, in FIG. 9 those of Ex. IX, in FIG. 10 those of Ex. X, in FIG. 11 those of Comparative Example 1, in FIG. 12 those of Comp. Ex. 2, in FIG. 13 those of Comp. Ex. 3, in FIG. 14 those of Comp. Ex. 4, in FIG. 15 those of Comp. Ex. 5, and in FIG. 16 those of Comp. Ex. 6.

The density (d) was measured according to ISO 1183 (D), the melt flow index (MFI) according to ISO 1133 (A/4).

The melt drawing force (MDF) and the maximum melt draw ratio (MDR) were determined by extruding an amount of the polyethylene through a die with a height of 8.0 mm and a diameter of 2.0 mm, at a temperature of 130° C. and with a yield of 0.25 g/minute, and drawing the extrudate to a thread until the thread broke. The force required for drawing and the draw ratio at break are the melt drawing force (in Newtons) and the maximum melt draw ratio, respectively.

The E-modulus was determined according to DIN 53457 (N/mm$^2$).

For the DSC measurements, use was made of a measuring set-up comprising a Perkin-Elmer DSC-2, arranged on-line with a Tektronix 4052 computer, a Hewlett-Packard 3495 A scanner-multiplexer and an HP 3455A digital Volt meter (5½—5½ digit).

The measurements were performed according to the 'continuous' measuring procedure of V. B. F. Mathot et al., J. Thermal Anal. Vol. 28, 349–358 (1983), reproduced on a relative scale.

The measurements were performed under nitrogen; after heating to 180° C. and a waiting time of 5 minutes, the sample was cooled to 45° C. at a scan rate of 5° C./minute. The samples weighed 5 mg and were weighed to the nearest 1 microgram with a Mettler Me 22/36 electronic microbalance. Every 0.2° C., the temperature and the measuring result corresponding to that temperature were recorded.

The crystallization temperatures mentioned in the tables were determined by this DSC method.

EXAMPLE I

Polyethylene a: d = 923.5 kg/m$^3$; MFI = 0.8 dg/minute.
Polyethylene b: d = 911 kg/m$^3$; MFI = 2.5 dg/minute.

| a/b | MDF cN | MDR x | E-mod. N/mm$^2$ | DSC cryst. temp., °C. | peak |
|---|---|---|---|---|---|
| 100/0 | 34 | 38 | 254 | 98.5 | narrow |
| 75/25 | 28 | 55 | 227 | 103 | broad |
| 0/100 | 4 | >757 | 177 | 107.5 | narrow |

EXAMPLE II

Polyethylene a: d = 923.5 kg/m$^3$; MFI = 0.8 dg/minute.
Polyethylene b: d = 906 kg/m$^3$; MFI = 2.5 dg/minute.

| a/b | MDF cN | MDR x | E-mod. N/mm$^2$ | DSC cryst. temp., °C. | peak |
|---|---|---|---|---|---|
| 100/0 | 34 | 38 | 254 | 98.5 | narrow |
| 75/25 | 29 | 53 | 221 | 102 | narrow |
| 0/100 | 2 | >757 | 133 | 105.5 | narrow |

EXAMPLE III

Polyethylene a: d = 923.5 kg/m$^3$; MFI = 0.8 dg/minute.
Polyethylene b: d = 902 kg/m$^3$; MFI = 2.9 dg/minute.

| a/b | MDF cN | MDR x | E-mod. N/mm$^2$ | DSC cryst. temp., °C. | peak |
|---|---|---|---|---|---|
| 100/0 | 34 | 38 | 254 | 98.5 | narrow |
| 75/25 | 27 | 54 | 215 | 102 | narrow |
| 0/100 | 2 | >757 | 110 | 105.5 | narrow |

EXAMPLE IV

Polyethylene a: d = 926 kg/m$^3$; MFI = 2.0 dg/minute.
Polyethylene b: d = 911 kg/m$^3$; MFI = 2.5 dg/minute.

| a/b | MDF cN | MDR x | E-mod. N/mm$^2$ | DSC cryst. temp., °C. | peak |
|---|---|---|---|---|---|
| 100/0 | 36 | 65 | 302 | 101 | narrow |
| 75/25 | 28 | 86 | 264 | 103.5 | broad |
| 0/100 | 4 | >757 | 177 | 107.5 | narrow |

EXAMPLE V

Polyethylene a: d = 926 kg/m³; MFI = 2.0 dg/minute.
Polyethylene b: d = 902 kg/m³; MFI = 2.9 dg/minute.

| a/b | MDF cN | MDR x | E-mod. N/mm² | DSC cryst. temp., °C | peak |
|---|---|---|---|---|---|
| 100/0 | 36 | 65 | 302 | 101 | narrow |
| 85/15 | 22.5 | 67 | 259 | 101.5 | narrow |
| 75/25 | 21.5 | 98 | 242 | 102.5 | narrow |
| 0/100 | 2 | >757 | 110 | 105.5 | narrow |

EXAMPLE VI

Polyethylene a: d = 926 kg/m³; MFI = 1.6 dg/minute.
Polyethylene b: d = 902 kg/m³; MFI = 2.9 dg/minute.

| a/b | MDF cN | MDR x | E-mod. N/mm² | DSC cryst. temp., °C | peak |
|---|---|---|---|---|---|
| 100/0 | 28 | 78 | 295 | 100 | narrow |
| 75/25 | 22 | 105 | 243 | 102 | narrow |
| 0/100 | 2 | >757 | 110 | 105.5 | narrow |

EXAMPLE VII

Polyethylene a: d = 926 kg/m³; MFI = 1.4 dg/minute.
Polyethylene b: d = 902 kg/m³; MFI = 2.9 dg/minute.

| a/b | MDF cN | MDR x | E-mod. N/mm² | DSC cryst. temp., °C | peak |
|---|---|---|---|---|---|
| 100/0 | 38 | 72 | 304 | 100 | narrow |
| 75/25 | 23 | 97 | 248 | 102 | narrow |
| 0/100 | 2 | >757 | 110 | 105.5 | narrow |

EXAMPLE VIII

Polyethylene a: d = 926 kg/m³; MFI = 0.3 dg/minute.
Polyethylene b: d = 902 kg/m³; MFI = 2.9 dg/minute.

| a/b | MDF cN | MDR x | E-mod. N/mm² | DSC cryst. temp., °C | peak |
|---|---|---|---|---|---|
| 100/0 | 25 | 29 | 308 | 100 | narrow |
| 75/25 | 25 | 101 | 245 | 102 | narrow |
| 0/100 | 2 | >757 | 110 | 105.5 | narrow |

EXAMPLE IX

Polyethylene a: d = 927 kg/m³; MFI = 1.3 dg/minute.
Polyethylene b: d = 902 kg/m³; MFI = 2.9 dg/minute.

| a/b | MDF cN | MDR x | E-mod. N/mm² | DSC cryst. temp., °C | peak |
|---|---|---|---|---|---|
| 100/0 | 21 | 40 | 320 | 102 | narrow |
| 75/25 | 22? | 90 | 269 | 104 | narrow |
| 70/30 | 27.4 | 71 | 263 | 104.5 | narrow |
| 0/100 | 2 | >757 | 110 | 105.5 | narrow |

EXAMPLE X

Polyethylene a: d = 927 kg/m³; MFI = 1.5 dg/minute.
Polyethylene b: d = 902 kg/m³; MFI = 2.9 dg/minute.

| a/b | MDF cN | MDR x | E-mod. N/mm² | DSC cryst. temp., °C | peak |
|---|---|---|---|---|---|
| 100/0 | 17.9 | 64 | 323 | 101.5 | narrow |
| 75/25 | 20.5 | 110 | 263 | 103 | broad |
| 70/30 | 23.1 | 100 | 253 | 103.5 | broad |

-continued

Polyethylene a: d = 927 kg/m³; MFI = 1.5 dg/minute.
Polyethylene b: d = 902 kg/m³; MFI = 2.9 dg/minute.

| a/b | MDF cN | MDR x | E-mod. N/mm² | DSC cryst. temp., °C | peak |
|---|---|---|---|---|---|
| 0/100 | 2 | >757 | 110 | 105.5 | narrow |

COMPARATIVE EXAMPLE 1

Polyethylene a: d = 920 kg/m³; MFI = 1.9 dg/minute.
Polyethylene b: d = 921 kg/m³; MFI = 4.1 dg/minute.

| a/b | MDF cN | MDR x | E-mod. N/mm² | DSC cryst. temp., °C | peak |
|---|---|---|---|---|---|
| 100/0 | 29 | 43 | 195 | 95 | narrow |
| 75/25 | 26 | 66 | 228 | 97, 105 | — |
| 0/100 | 5 | >757 | 318 | 107.5 | narrow |

COMPARATIVE EXAMPLE 2

Polyethylene a: d = 920 kg/m³; MFI = 1.9 dg/minute.
Polyethylene b: d = 911 kg/m³; MFI = 5.5 dg/minute.

| a/b | MDF cN | MDR x | E-mod. N/mm² | DSC cryst. temp., °C | peak |
|---|---|---|---|---|---|
| 100/0 | 29 | 43 | 195 | 95 | narrow |
| 85/15 | 24 | 58 | 193 | 96.5, 103 | shoulder |
| 75/25 | 22 | 76 | 190 | 96, 105 | — |
| 50/50 | 17.5 | 147 | 186 | 95, 107 | — |
| 0/100 | 4 | >757 | 177 | 108 | narrow |

COMPARATIVE EXAMPLE 3

Polyethylene a: d = 920 kg/m³; MFI = 1.9 dg/minute.
Polyethylene b: d = 919 kg/m³; MFI = 4.6 dg/minute.

| a/b | MDF cN | MDR x | E-mod. N/mm² | DSC cryst. temp., °C | peak |
|---|---|---|---|---|---|
| 100/0 | 29 | 43 | 195 | 95 | narrow |
| 75/25 | 25 | 80 | 215 | 95, 105 | — |
| 0/100 | 4 | >757 | 283 | 107.5 | narrow |

COMPARATIVE EXAMPLE 4

Polyethylene a: d = 922 kg/m³; MFI = 0.8 dg/minute.
Polyethylene b: d = 911 kg/m³; MFI = 5.5 dg/minute.

| a/b | MDF cN | MDR x | E-mod. N/mm² | DSC cryst. temp., °C | peak |
|---|---|---|---|---|---|
| 100/0 | 31 | 30 | 236 | 97 | narrow |
| 90/10 | 24.5 | 35 | 218 | 98 | broad |
| 85/15 | 27 | 28 | 215 | 99 | broad |
| 75/25 | 26 | 45 | 211 | 97.5, 104.5 | — |
| 0/100 | 5 | >757 | 177 | 108 | narrow |

COMPARATIVE EXAMPLE 5

Polyethylene a: d = 931 kg/m³; MFI = 1.7 dg/minute.
Polyethylene b: d = 921 kg/m³; MFI = 5.5 dg/minute.

| a/b | MDF cN | MDR x | E-mod. N/mm² | DSC cryst. temp., °C | peak |
|---|---|---|---|---|---|
| 100/0 | 39 | 85 | 428 | 104.5 | narrow |
| 85/15 | 20 | 82 | 402 | 107 | narrow |
| 75/25 | 17 | 97 | 392 | 107 | narrow |
| 50/50 | 14 | 198 | 361 | 108 | narrow |
| 0/100 | 5 | >757 | 318 | 107.5 | narrow |

COMPARATIVE EXAMPLE 6

If the profile was sticky after 6 weeks, it was rated —, and if it was not sticky it was rated +.

The results are listed in the following table.

| Example | foam processing | foam density kg/m³ | % closed cells | flexibility | softness | high temp. resistance |
|---|---|---|---|---|---|---|
| IV 100/o | | | | | | |
| V 100/o | good | 36 | 82 | — | — | + |
| VI 100/o | good | 37 | 83 | — | — | + |
| 1 100/o | | | | | | |
| 2 100/o | good | 36 | 77 | + | + | — |
| 3 100/o | | | | | | |
| 5 100/o | | | | | | |
| 6 100/o | good | 38 | 84 | — | — | + |
| III o/100 | | | | | | |
| V o/100 | | | | | | |
| VI o/100 | | | | | | |
| VII o/100 | collapse | | | | | |
| VIII o/100 | | | | | | |
| IX o/100 | | | | | | |
| X o/100 | | | | | | |
| 1 o/100 | collapse | | | | | |
| 5 o/100 | | | | | | |
| 2 o/100 | | | | | | |
| 2 o/100 | collapse | | | | | |
| 6 o/100 | | | | | | |
| VI 75/25 | good | 38 | 78 | ++ | ++ | + |
| VII 75/25 | good | 34 | 80 | ++++ | ++++ | + |
| IX 70/30 | good | 36 | 72 | +++ | ++++ | + |
| X 70/30 | good | 34 | 79 | ++ | ++ | + |
| 1 75/25 | collapse | | | | | |
| 4 75/25 | collapse | | | | | |
| 6 75/25 | good | 35 | 74 | — | — | + |

Polyethylene a: d = 931 kg/m³; MFI = 1.7 dg/minute.
Polyethylene b: d = 911 kg/m³; MFI = 5.5 dg/minute.

| a/b | MDF cN | MDR x | E-mod. N/mm² | DSC cryst. temp., °C. | peak |
|---|---|---|---|---|---|
| 100/0 | 39 | 85 | 428 | 104.5 | narrow |
| 75/25 | 17 | 135 | 346 | 106.5 | narrow |
| 0/100 | 4 | >757 | 177 | 108 | narrow |

EXAMPLE XI

Of a number of polyethylene compositions from the examples, round foam profiles were made with the aid of an extruder commonly used for foam extrusion. The temperature of the extruder head was set to 3 (Ω 0.5)° C. above the (highest) crystallization temperature of the polyethylene composition.

As blowing agent, a 50/50 (m/m) mixture of Freon 12 (dichlorotetrafluoroethane) and Freon 114 (dichlorofluoromethane) was added, in an amount of 15 parts by weight of blowing agent and 85 parts by weight of polymer. 0.2% seeding agent was added to the polymer in the form of a masterbatch (LDPE with 20 wt % sodium bicarbonate and citric acid), and lubricant was also added (0.2 wt % oleamide).

The round foam profile thus formed was assessed in terms of flexibility and softness by manual bending and compression, respectively.

The high-temperature resistance was determined by keeping the round foam profile at 100° C. for 6 weeks.

I claim:

1. Process for the manufacture of foamed objects by mixing a polyethylene composition with at least one or more foaming agents at increased pressure and temperature and passing the composition via an extruder through an extrusion opening into a zone with a lower pressure and temperature, wherein the polyethylene composition includes 20–98 wt % branched polyethylene (a) with a density of between 915 and 940 kg/m³ and a melt flow index of between 0.05 and 40 dg/minute, prepared by a high pressure radical process, and 2–80 wt % substantially linear polyethylene (b) with a density of between 850 and 915 kg/m³, a melt flow index of between 0.05 and 25 dg/minute and a DSC crystallinity at 23° C. of at least 10%, prepared with the aid of a transition metal catalyst, the difference between the highest crystallization temperature of branched polyethylene (a) and the highest DSC crystallization temperature of linear polyethylene (b) being at most 10° C. and the mixture having a modulus of elasticity of at most 280 N/mm².

2. Process according to claim 1, characterized in that the foaming agents are physical foaming agents.

3. Process according to claim 1, characterized in that the polyethylene composition is in addition mixed with one or more crosslinking agents.

4. Process according to claim 1, characterized in that the polyethylene composition is in addition mixed with one or more lubricants.

* * * * *